(12) United States Patent
Kallioinen et al.

(10) Patent No.: US 11,278,865 B2
(45) Date of Patent: Mar. 22, 2022

(54) EXTRACTED LIGNOCELLULOSIC MATERIAL AS AN ADSORBENT AND USES THEREOF

(71) Applicant: Lappeenrannan—Lahden teknillinen yliopisto LUT, Lappeenranta (FI)

(72) Inventors: Mari Kallioinen, Lappeenranta (FI); Mika Mänttäri, Lappeenranta (FI)

(73) Assignee: Lappeenrannan—Lähden teknillinen yliopisto LUT, Lappeenranta (FI)

( * ) Notice: Subject to any disclaimer, the term of this patent is extended or adjusted under 35 U.S.C. 154(b) by 183 days.

(21) Appl. No.: 16/492,623

(22) PCT Filed: Mar. 28, 2018

(86) PCT No.: PCT/FI2018/050230
§ 371 (c)(1),
(2) Date: Sep. 10, 2019

(87) PCT Pub. No.: WO2018/178515
PCT Pub. Date: Oct. 4, 2018

(65) Prior Publication Data
US 2020/0047156 A1 Feb. 13, 2020

(30) Foreign Application Priority Data

Mar. 29, 2017 (FI) ....................... 20175292
Mar. 29, 2017 (FI) ....................... 20175293

(51) Int. Cl.
| | | |
|---|---|---|
| *B01J 20/24* | (2006.01) | |
| *B01J 20/28* | (2006.01) | |
| *B01J 20/30* | (2006.01) | |
| *B01J 20/34* | (2006.01) | |
| *C02F 1/28* | (2006.01) | |
| *C02F 101/20* | (2006.01) | |
| *C02F 101/30* | (2006.01) | |
| *C02F 101/32* | (2006.01) | |
| *C02F 103/00* | (2006.01) | |
| *C02F 103/28* | (2006.01) | |
| *C02F 103/34* | (2006.01) | |
| *C02F 103/36* | (2006.01) | |

(52) U.S. Cl.
CPC ......... *B01J 20/24* (2013.01); *B01J 20/28004* (2013.01); *B01J 20/3071* (2013.01); *B01J 20/34* (2013.01); *C02F 1/286* (2013.01); *B01J 2220/4825* (2013.01); *C02F 2101/20* (2013.01); *C02F 2101/306* (2013.01); *C02F 2101/32* (2013.01); *C02F 2103/001* (2013.01); *C02F 2103/28* (2013.01); *C02F 2103/343* (2013.01); *C02F 2103/365* (2013.01); *C02F 2303/16* (2013.01)

(58) Field of Classification Search
CPC .. B01J 20/24; B01J 20/28004; B01J 20/3071; B01J 20/34; B01J 20/28; B01J 2220/4825; C02F 1/286; C02F 1/285; C02F 2101/20; C02F 2101/306; C02F 2101/32; C02F 2101/38; C02F 2103/001; C02F 2103/28; C02F 2103/343; C02F 2103/365; C02F 2103/16; C02F 2103/32
See application file for complete search history.

(56) References Cited

U.S. PATENT DOCUMENTS

| | | | | |
|---|---|---|---|---|
| 4,222,897 A | * | 9/1980 | Rollmann | B01J 20/3078 502/400 |
| 5,401,417 A | * | 3/1995 | Dentel | B01D 15/00 210/674 |
| 6,294,118 B1 | * | 9/2001 | Huber | A01K 1/0152 119/173 |
| 2004/0231059 A1 | | 11/2004 | Mälkki et al. | |
| 2008/0142176 A1 | | 6/2008 | Van Heiningen et al. | |
| 2011/0129886 A1 | | 6/2011 | Howard et al. | |
| 2014/0083947 A1 | * | 3/2014 | Al-Sarra | C02F 1/42 210/670 |

FOREIGN PATENT DOCUMENTS

SU    465425 A1    3/1975

OTHER PUBLICATIONS

Ajmal, Mohammed et. al 1998 "role of sawdust in the removal of copper(II) from industrial wastes" Wat. Res. vol. 32, No. 10, pp. 3085-3091 (Year: 1998).*

(Continued)

*Primary Examiner* — Liam Royce
(74) *Attorney, Agent, or Firm* — Meunier Carlin & Curfman LLC (57) ABSTRACT

According to an example aspect of the present invention, there is provided a method of removing dissolved contaminants from an aqueous liquid. The aqueous liquid is contacted with an adsorbent which comprises a finely divided lignocellulosic material, which has been subjected to extraction to remove hemicellulose and/or other components therefrom, to bind at least a portion of the organic compounds to the adsorbent. Furthermore, the invention relates to a method for removing or separating dissolved contaminants from a liquid and to a method for producing a liquid containing hemicellulose and/or an adsorbent containing lignin and/or other components. In particular the invention concerns the use of an adsorbent lignocellulosic material for removing dissolved contaminants from a liquid.

28 Claims, 3 Drawing Sheets

(56) References Cited

OTHER PUBLICATIONS

Jeong, Tae-Su et. al 2010 "Optimizing dilute-acid pretreatment of rapeseed straw for extraction of hemicellulose". Appl Biochem Biotechnol (2010) 161:22-33. DOI 10.1007/s12010-009-8898-z (Year: 2010).*

Koivula, E. et. al. 2011 "Evaluation of various pretreatment methods to manage fouling in ultrafiltration of wood hydrolysates". Separation and Purification Technology 83 (2011) 50-56. doi:10.1016/j.seppur.2011.09.006 (Year: 2011).*

Froschauer et. al 2013 "separation of hemicellulose and cellulose from wood pulp by means of ionic liquid/cosolvent systems". Biomacromolecules 2013, 14, 1741-1750. dx.doi.org/10.1021/bm400106h (Year: 2013).*

Shukla, A. et al.: "The role of sawdust in the removal of unwanted materials from water", In: Journal of Hazardous Materials, Amsterdam, NL: Elsevier, Nov. 11, 2002, vol. 95, pp. 137-152, ISSN: 0304-3894.

Nag, A.: "Utilization of charred sawdust as an adsorbent of dyes, toxic salts and oil from water", In: Process Safety and Environmental Protection, Nov. 1995, vol. 73, pp. 299-304.

Chen, G.-G. et al.: "High Strength Hemicellulose-Based Nanocomposite Film for Food Packaging Applications", In: Sustainable Chem. Eng. American Chemical Society ACS Publications, Feb. 26, 2016, vol. 4, pp. 1985-1993, <DOI: 10.1021/acssuschemeng.5b01252>.

Djilali, Y. et al.: "Alkaline treatment of timber sawdust: A straightforward route toward effective low-cost adsorbent for the enhanced removal of basic dyes from aqueous solutions", Journal of Saudi Chemical Society, Elsevier, Amsterdam, NL, vol. 20, Nov. 15, 2012, XP029783388, ISSN: 1319-6103, DOI: 10.1016/J.JSCS.2012.10.013.

* cited by examiner

EXTRACTED LIGNOCELLULOSIC MATERIAL AS AN ADSORBENT AND USES THEREOF

PRIORITY

This application is a U.S. national application of the international application number PCT/FI2018/050230 filed on Mar. 28, 2018 and claiming priority of Finnish national applications 20175292 and 20175293 filed on Mar. 29, 2017 the contents of all of which are incorporated herein by reference.

FIELD OF THE INVENTION

The present invention relates to removal and separation of contaminants from aqueous liquids. In particular the invention concerns the use of an adsorbent lignocellulosic material for removing dissolved contaminants from an aqueous liquid. Furthermore, the invention relates to a method for removing or separating dissolved contaminants from a liquid and to a method for producing a liquid containing hemicellulose and/or an adsorbent containing lignin and/or other components. In particular the invention concerns the use of an adsorbent lignocellulosic material for removing dissolved contaminants from a liquid.

BACKGROUND

Water pollution occurs when pollutants, such as chemical contaminants, are directly or indirectly discharged into bodies of water such as lakes, rivers, oceans, aquifers and groundwater.

Chemical contaminants include both organic and inorganic substances.

Examples of organic contaminants include detergents, disinfection by-products found in chemically disinfected drinking water, such as chloroform, food processing waste, which can include oxygen-demanding substances, such as fats and grease, insecticides and herbicides, comprised of for example, a huge range of organohalides and other chemical compounds, petroleum hydrocarbons, including fuels (gasoline, diesel fuel, jet fuels, and fuel oil) and lubricants (motor oil), and fuel combustion byproducts, from storm water runoff, volatile organic compounds, such as industrial solvents, from improper storage, chlorinated solvents, for example polychlorinated biphenyl (PCBs), and trichloroethylene, perchlorate, various chemical compounds found in personal hygiene and cosmetic products, and pharmaceutical drugs and their metabolites as well as compounds dissolved from wood in different treatments such as lignin and its derivatives and wood lipophilic and phenolic extractives.

Inorganic contaminants include sulfur dioxide from industrial discharges, ammonia from food processing waste, industrial by-products, nitrates and phosphates from fertilizers, and heavy metals from e.g. acid mine drainage.

The pulp and paper industry is one of the heaviest users of water in the industrial economy using even tens of cubic meters of water for every ton of product depending on the product and process. Pulp and paper mills produce wastewater in volume which must be treated before water can either be recycled for use in the mills or safely discharged. Improving the recovery of contaminants stemming from pulp and paper mill process and waste water is therefore imperative.

The production of new biobased products such as hemicelluloses from lignocellulosic materials needs also large volumes of water and purification of final products from impurities is needed.

In the art, there are a number of solutions for removing, for example pollutants in municipal waste water treatment plants (WWTP). Suitable methods include the use of active sludge, filtration and the addition of chemical components. For removing micropollutants it has recently been suggested to use of powder activated carbon (PAC) as a complement to municipal WWTP in order to achieve a significant reduction of micropollutants and ecotoxicity in receiving waters.

The conventional technologies are hampered by the costs of providing suitable absorbents. In case of mechanical technologies, such as filtering, clogging is a conventional problem which is encountered in particular when the aqueous streams contain colloidal impurities. In membrane filtration fouling of the filtration material is also caused by adsorption of organic compounds on the membrane structure.

SUMMARY OF THE INVENTION

It is an aim of the invention to overcome at least some of the above mentioned disadvantages and to provide a method of separating contaminants from aqueous flows and effluents using materials.

It is another aim of the invention to provide a method of separating contaminants, which method can be used as a preliminary purification step before conventional separation technologies.

The present invention is based on the concept of using extracted lignocellulosic material as an adsorbent for the removal of contaminants from aqueous liquids. In a further embodiment the present invention provides a single method by combining production of adsorbents for separating contaminants and separation of contaminants.

According to a first aspect of the present invention, there is provided an adsorbent which comprises a finely divided lignocellulosic material, which has been subjected to extraction to remove hemicellulose components and optionally smaller molar mass carbohydrates therefrom. In some embodiments, the lignocellulosic material is extracted with an aqueous solution, which may contain acidic or buffering components, to remove a significant portion of the hemicelluloses and optionally other compounds contained therein. The material thus obtained has surprisingly been found to efficiently remove contaminants, such as dispersed or dissolved contaminants, from liquids (e.g. aqueous liquids).

In further embodiments of the invention an aim is e.g. to reduce impurities of a liquid or aqueous flows or to provide a method of separating contaminants such as lignin and/or other components from a liquid such as an extraction liquid of lignocellulosic material. In this way fractions (e.g. effluents) containing an increased amount of components of interest, such as hemicelluloses, are obtained.

The invention is defined by the features of the independent claims. Specific embodiments are defined in the dependent claims.

The present invention relates to a method of removing dissolved contaminants from a liquid, wherein the liquid is contacted with an adsorbent which comprises a finely divided lignocellulosic material, which has been subjected to extraction to remove hemicellulose and/or other components therefrom, to bind at least a portion of the organic compounds to the adsorbent.

Also, the present invention relates to a method for separating dissolved contaminants (e.g. a lignin component and/or other components) from a liquid (e.g. an extraction liquid), wherein the method comprises discharging a liquid through an adsorbent which comprises a cooled finely divided lignocellulosic material, which has been subjected to extraction to remove hemicellulose and/or other components therefrom, to precipitate and/or bind lignin and/or other components with the adsorbent (e.g. on or within the adsorbent), wherein optionally said liquid cools when contacted with the adsorbent.

Still, the present invention relates to a method for producing a liquid containing hemicellulose and/or other components and/or an adsorbent containing impurities (e.g. lignin and/or other components), wherein the method comprises contacting a liquid with an adsorbent which comprises a finely divided lignocellulosic material, which has been subjected to extraction to remove hemicellulose and/or other components therefrom, to precipitate and/or bind impurities (e.g. lignin and/or other components) with the adsorbent (e.g. on or within the adsorbent) and optionally recovering a modified liquid contacted with the adsorbent, wherein said liquid cools when contacted with the adsorbent.

Considerable advantages are obtained by the invention. Thus, the novel adsorbents have excellent absorption and adsorption properties. They can be used for removing by sorption a number of pollutants, both organic and inorganic substances as well as microbial components, from aqueous streams and effluents. The novel materials can be combined with other separation processes to achieve a pre-purification step. In a particularly preferred embodiment, the method is combined with conventional mechanical separation operations, such as membrane filtration.

The present adsorbent materials can be produced by a straightforward method using inexpensive starting materials. In particular, the material is produced from lignocellulosic raw-materials obtained as a by-product in other processes. In addition to other advantages the method of the present invention is very simple, efficient, cost-effective and environmentally friendly.

Further features and advantages of specific embodiments will be discussed in more detail in the following detailed description.

BRIEF DESCRIPTION OF THE DRAWINGS

(101), UV absorbance of pure water after treatment with extracted wood (an adsorbent), a minor amount of UV absorbing material dissolved from adsorbent (please note that the absorbent was not washed), (102), Extract absorbance after treating with an adsorbent (i.e. sawdust after extraction) subtracted by pure water absorbance after similar treatment, (103), Extract absorbance after treating with an adsorbent (i.e. sawdust after extraction), (104), Absorbance of an original extract (i.e. without contacting the extract with an adsorbent).

(105), UV absorbance at wavelength of 228 nm,
(106), UV absorbance at wavelength of 278 nm,
(107) UV absorbance at wavelength of 208 nm;
FIG. 3 reveals 400% higher permeate flux after pretreatment of the extract with the adsorbent (extracted wood).

(108), Permeate flux through the UH004P membrane in the filtration of extract (original extraction liquor), (109), Permeate flux through the UH004P membrane in the filtration of an extract after pretreatment with the extracted wood.

DEFINITIONS

In the present context, the term "lignocellulosic material" comprises plant dry matter composed of carbohydrate polymers including cellulose and hemicellulose, and lignin. "Lignocellulosic material" includes virgin lignocellulosic material such as wood chips from, for example, softwood, for example spruce, pine or larch, or from hardwood, such as birch, poplar, aspen, alder, eucalyptus or mixed tropical hardwood, or mixtures thereof. "Lignocellulosic material" also includes recycled lignocellulosic materials as well as waste lignocellulosic material, such as by-products from industry and agriculture such as corn stover, sugarcane, bagasse, cotton, straw etc. and saw mill, pulp mill and paper mill discards.

The term "aqueous liquids" means liquids in which there is at least some water present including for example, industrial effluents such as hot water extraction liquors, extraction liquors from wood pulping mills, waste waters from pharmaceutical plants, waste waters from oil refineries, as well as agricultural run-offs and waterways such as canals and rivers, other bodies of water such as reservoirs, and natural or man-made ponds or lakes.

The term "contaminants" comprises inorganic and organic compounds, typically dissolved in aqueous liquids. Similarly, "impurity" can be defined in the same way. "Components" can be defined in the same way or may comprise contaminants.

Examples of "organic contaminants" include but are not limited to detergents, disinfection by-products found in chemically disinfected drinking water, such as chloroform, food processing waste, which can include oxygen-demanding substances, such as fats and grease, insecticides and herbicides, comprised of for example, a huge range of organohalides and other chemical compounds, petroleum hydrocarbons, including fuels (gasoline, diesel fuel, jet fuels, and fuel oil) and lubricants (motor oil), and fuel combustion by-products, from storm water runoff, volatile organic compounds, such as industrial solvents, from improper storage, chlorinated solvents, for example polychlorinated biphenyl (PCBs), and trichloroethylene, perchlorate, various chemical compounds found in personal hygiene and cosmetic products, and pharmaceutical drugs and their metabolites as well as compounds dissolved from wood in different treatments such as lignin and its derivatives and wood lipophilic and phenolic extractives. "Organic components" can be defined in the same way or may comprise organic contaminants.

"Organic compounds" includes compounds and substances comprising mixtures of compounds such as those found in industrial effluents including for example phenolic compounds, resinous and fatty acids, nitrogenous compounds, such as drug or pesticide residues or proteins, polymeric compounds and oils.

"Inorganic compounds" includes sulfur dioxide from industrial discharges, ammonia from food processing waste, industrial by-products, nitrates and phosphates from fertilizers, and heavy metals from e.g. acid mine drainage.

"Extraction Liquor" or "extraction liquid" is a solution into which organic substances have been extracted from lignocellulosic material.

"Chips" includes wood chips, bark chips and nutshells. In particular, "chips" refers to slate-like or plate-like particles.

"Saw dust" stands for finely divided wood material obtained from mechanical processing of wood and bark for example by sawing and typically comprising irregularly shaped particles or spherical or cubical particles. Commonly, the particles of saw dust are smaller in size than "chips" and pass through sieves of Tyler Mesh 10 or greater, in particular up to at least Tyler Mesh 80.

As used herein "membrane filtration" refers to a technique which is used to separate particles from a liquid for the purpose of purifying it, in other words a solvent is passed through a semi-permeable membrane. Membrane filtration techniques include nanofiltration, ultrafiltration, microfiltration and reverse osmosis.

As used herein "precipitation" refers to a creation of a solid from a solution. Precipitation utilized in the present invention is carried out by a decreased temperature either alone or in combination with other methods such as lowering the pH or by adding antisolvents.

Wood biomass is mainly composed of carbohydrates, namely cellulose and hemicellulose, and lignin. Lignin is of great interest for various material applications, such as carbon fibres and phenolic-based chemicals. Cellulose has been utilized efficiently in the production of e.g. paper, paperboard, card stock, inactive fillers in drug tablets and thickeners or stabilizers in processed foods. Hemicelluloses can be used for replacing compounds originating from oil and thus in manufacturing of several products.

Pulping processes are used for separating cellulose from lignin, hemicellulose and other components of lignocellulosic materials. The recovery of hemicelluloses from wood is done by extraction, for instance with pressurised water. In the extraction also other compounds than hemicelluloses are dissolved into the wood extraction liquid. Thus, to enable the further use of hemicelluloses, they have to be separated, purified and concentrated from the wood extraction liquid. This can be done with membrane filtration. However, lignin and its derivatives and small organic compounds present as impurities in the wood extract cause remarkable membrane fouling, which decreases significantly the efficiency of membrane filtration step.

Hemicellulose fractions can be recovered from wood extract and purified for instance with expensive oil-based, polymeric adsorbents or with activated carbon. Thus, a waste fraction containing lignin and adsorbents is produced and it is difficult to utilize lignin from this fraction for further applications.

DETAILED DESCRIPTION OF THE INVENTION

As mentioned above, the present invention relates to a method of removing contaminants from a liquid, typically an aqueous liquid. The liquid is contacted with an adsorbent. By means of the invention, it has surprisingly been found that lignocellulosic material that has been subjected to extraction to remove hemicellulose components is an excellent adsorbent. The extracted lignocellulosic material, which is finely divided, removes at least a portion of contaminants from liquids by binding the contaminants to the adsorbent.

The liquids are typically aqueous although the present technology is suitable also for treating non-aqueous liquids or anhydrous liquids. Thus, the "liquid" can be for example formed by an organic liquid, such as a polar or non-polar organic liquid. Such liquids are typically selected from the group of aliphatic and aromatic alcohols, ketones, aldehydes, ethers, esters as well as various hydrocarbon liquids, which may be halogenated.

Many industrial effluents are aqueous, and the present technology is particularly suitable for processing of such flows.

One embodiment of the present invention provides a method of removing contaminants from an aqueous liquid, wherein the aqueous liquid is contacted with an adsorbent which comprises a finely divided lignocellulosic material, which has been subjected to extraction to remove hemicellulose components therefrom, to bind at least a portion of the contaminants to the adsorbent, for example in the case of extraction liquor the adsorbent binds and removes lignin from the liquor, thus providing a means to recover target compounds such as further hemicelluloses, which are useful as raw materials in the production of e.g. biopolymers, from the liquor.

In an embodiment the contaminants are selected from dissolved inorganic and organic compound and mixtures thereof.

In one embodiment the adsorbent is obtained by extracting lignocellulosic material with an aqueous solution, optionally containing an alkaline, acidic or buffering component, to remove a significant portion of the hemicelluloses and/or other components contained therein. The pH of the aqueous solution is typically less than or equal to 5.0, preferably less than or equal to 4.6, suitably in the range of 2.8 to 4.2, most preferably in the range of 3.0 to 4.0. High molar mass hemicelluloses are easier to separate from extraction liquor by ultrafiltration than hemicelluloses of lower molar mass. Removal of a significant portion of the hemicellulose and/or other components contained therein from the lignocelluosic material provides an extracted lignocelluosic material.

In an embodiment the lignocellulosic material used as an adsorbent has a hemicellulose content which is at least 10 wt-%, preferably at least 20 wt-%, in particular 30 to 95 wt-%, smaller than that of the lignocellulosic material before extraction. Removal of greater amounts of hemicellulose from the lignocellulosic material increases the adsorbent properties of the adsorbent.

In a further embodiment the finely divided lignocellulosic material used as adsorbent has a lignin content which is at least 60 wt %, preferably 70 wt-%, suitably 80 wt-% of the lignin content of the lignocellulosic material before extraction. A high lignin content is desirable as lignin has a great affinity for adsorbing both inorganic contaminants, such as heavy metals, and organic contaminants, such as polymeric compounds and oils.

The adsorbent can be obtained by various means and methods. In one embodiment the adsorbent is obtained by subjecting the lignocellulosic material to hot water extraction, said hot water extraction preferably being carried out at temperature in excess of 100° C., for example about 110 to 250° C., in particular 120 to 200° C., such as 145 to 200° C. The treatment time depends on temperature. Typically the duration is 5 min to 7 days, for example 10 min to 2 days for example 15 min to 720 min. Higher temperatures and longer extraction times lead to higher extraction yields, i.e. a greater amount of the hemicelluloses is extracted as temperature and time of extraction increase.

In a very specific embodiment an extraction of the present invention aims to dissolve soluble compounds from the lignocellulosic material and not to degrade them. Indeed, in a very specific embodiment extraction does not hydrolyse polysaccharides of the lignocellulosic material but preserves their polymeric structure.

In one embodiment the lignocellulosic material is recovered after extraction and used as an adsorbent for binding dissolved compounds from the aqueous liquid essentially without any intermittent washing of the lignocellulosic material. This provides an economically and environmentally sound way of binding the crudest compounds from the aqueous liquids.

In a further embodiment the lignocellulosic material is recovered after extraction and washed, and is used as an adsorbent for binding dissolved compounds from the aqueous liquid. After washing, the adsorbent has a greater available surface and a larger number of functional groups available for the binding of dissolved compounds from the aqueous liquid.

In a still further embodiment the lignocellulosic material recovered after extraction is dried before use as an adsorbent for binding dissolved compounds from the aqueous liquid. Drying the adsorbent increases the adsorption of dissolved compounds from the aqueous liquid.

In an embodiment, the lignocellulosic material is used as an adsorbent at conditions which are different from those employed during the extraction of the hemicelluloses.

In one embodiment of the invention liquid removed from the lignocellulosic material (for example a wood extraction liquid containing lignin) is discharged through an adsorbent bed and thus lignin and/or other compounds of the liquid are precipitated and/or bound on or within said adsorbent. In this way the liquid is purified from lignin and optionally other components.

The intensified biorefinery process of one embodiment of the present invention enables the use of low-cost wood-based adsorbents instead of the expensive oil-based polymeric adsorbents for removal of impurities such as lignin. The present adsorbent materials as well as the liquid to be contacted with the adsorbent can be produced by a straightforward method using inexpensive starting materials. In particular, the material and liquid are produced from lignocellulosic raw-materials obtained as by-products in other processes. In a specific embodiment the adsorbent and the liquid used in a method of the present invention are obtained from the same starting lignocellulosic material.

In summary, one embodiment of the present method is an intensified method, which both 1) facilitates the recovery of a liquid comprising components such as hemicelluloses as purified and concentrated fractions from wood extracts and 2) produces solid wood-based material, which is excellent e.g. for manufacturing pellets for heating purposes. The intensified process combines an extraction process and a further downstream purification process (adsorption) into one process where the residual lignocellulosic material (such as saw dust from the previous extraction), which has been subjected to extraction, is utilised as a purification material (adsorbent). The present invention utilizes all the wood material fed to a process and no waste fractions are produced. Therefore, the present invention improves the total material yield.

Indeed, in a very specific embodiment the methods and techniques provided by this invention enable wood or herbaceous biomass to be utilized very efficiently in a single process, wherein the lignocellulosic material can be separated into i) a liquid comprising lignin, hemicellulose and optionally other components, and ii) a solid lignocellulosic material subjected to extraction to remove hemicellulose and/or other components therefrom (i.e. an adsorbent) for adsorbing lignin and/or other components from a liquid.

Lignocellulosic material may be extracted to remove one or more selected from the group consisting of hemicellulose, lignin, wood lipophilic extractives and wood phenolic extractives.

In an embodiment of the invention the liquid to be contacted with the adsorbent contains hemicellulose, lignin, wood lipophilic extractives, wood phenolic extractives, oligosaccharides and/or monosaccharides or any combination thereof. In a specific embodiment of the invention the modified liquid, i.e. the liquid contacted with the adsorbent, contains dissolved hemicelluloses. The principal hemicellulose in softwood is galactoglucomannan, which accounts for approx. 20% of the dry material. Xylan is the main hemicellulose in hardwood and varies in content within the limits of 15-30% of the dry wood.

In a specific embodiment the present invention utilizes cold adsorbent or lignocellulosic material subjected to extraction for precipitating and bound lignin and/or other contaminants of a liquid within an adsorbent. Temperature of an adsorbent is lower than the temperature of an extraction vessel or a liquid, thus surprisingly enabling enhanced precipitation of components such as lignin. Other cooling methods than contacting the liquid with the adsorbent are not necessarily needed for said liquid.

Furthermore, the novel adsorbents have excellent absorption and adsorption properties and they can be used for precipitating lignin and/or other components at a lowered temperature. Indeed, the lignocellulosic material subjected to extraction purifies extraction liquor by removing lignin and/or other wood extraction compounds. This increases the purity of target compounds such as hemicelluloses.

In one embodiment the method further comprises cooling the adsorbent or lignocellulosic material subjected to extraction before contacting the adsorbent with the liquid. As an example the adsorbent or lignocellulosic material subjected to extraction is cooled by a freezer. In one specific embodiment the adsorbent or lignocellulosic material subjected to extraction has a lower temperature than the liquid, e.g. the temperature of the adsorbent or lignocellulosic material subjected to extraction is $000°$ C. or more than $0°$ C. when contacted with the liquid. In a very specific embodiment the temperature of the adsorbent or lignocellulosic material subjected to extraction is less than $0°$ C. when contacted with the liquid. The present invention may utilize a cold or frozen adsorbent to cool down the liquid and in a specific embodiment other cooling methods are not needed. The present invention thus enables reduction of method steps as well as energy consumption e.g. when compared to a method comprising cooling of the liquid with a cooling coil.

When a warm or hot liquid is contacted with a cold adsorbent, the temperature of the liquid decreases and the temperature of the adsorbent increases. In a specific embodiment of the invention the temperature of the liquid to be contacted with the adsorbent is the same or lower than the extraction temperature, e.g. the temperature of the liquid may be selected from 80-200° C. or 100-150° C., such as 80° C., 90° C., 100° C., 110° C., 120° C., 130° C., 140° C., 150° C., 160° C., 170° C., 180° C., 190° C. or 200° C. In a specific embodiment of the invention the temperature of the liquid to be contacted with the adsorbent is selected from the group consisting of 80-200° C. or 100-150° C. and the temperature of the adsorbent or lignocellulosic material subjected to extraction is less than 0° C.

In a very specific embodiment the lignocellulosic material is subjected to extraction in an extraction chamber and the resulting extraction liquid is conducted from the extraction chamber to the adsorbent. When the liquid passes through the cold adsorbent it cools down. In other words the cold adsorbent cools the liquid thereby facilitating the precipitation of contaminants and in addition the adsorption of the contaminants. Therefore the liquid contacted with the adsorbent is highly purified.

In a very specific embodiment the lignocellulosic material subjected to a first extraction is cooled and used for separating a lignin component and/or other components of an extraction liquid obtained from a second extraction. Furthermore, the lignocellulosic material subjected to a second extraction is cooled and used for separating a lignin component and/or other components of an extraction liquid obtained from a third extraction and so on. Thus the method of the present invention may be utilized several times in a single continuous or batch process, comprising several extractions and purifications of extraction liquids. In other embodiments the adsorbent may be used for purifying e.g. a liquid from any kind of extraction method (e.g. not sequential to an extraction of lignocellulosic material to obtain an adsorbent) or for purifying a liquid extracted from another lignocellulosic material than used for obtaining an adsorbent.

It is in some cases desirable that the extracted lignocellulosic material is functionalised. Such functionality is useful to vary the adsorbability of the material. In one embodiment the extracted lignocellulosic material is treated with a chemical agent selected from the group of alkaline compounds, acidic compounds and solvents and combinations thereof to modify its adsorption properties, before use. Treatment of the extracted lignocellulosic material with a chemical agent allows diverse functionalities to be introduced to the lignocellulosic material by chemical reaction.

In one embodiment, the method of the invention is free of synthetic polymeric adsorbents.

The lignocellulosic material to be extracted comes from various sources of biomass ranging from annual and perennial plants, for example grasses such as bamboo, to wood or nutshells. In an embodiment the lignocellulosic material comprises wood, such as softwood, for example spruce, pine or larch, hardwood, such as birch, poplar, aspen, alder, eucalyptus, oak or mixed tropical hardwood, or mixtures thereof. In one embodiment the lignocellulosic material to be extracted comprises bark of the said wood(s). In another embodiment the lignocellulosic material to be extracted comprises nutshells.

The lignocellulosic material is finely divided. In an embodiment the lignocellulosic material comprises sawdust. The sawdust can comprise wood sawdust or bark sawdust or a combination thereof. In a still further embodiment the lignocellulosic material to be extracted comprises chips. The chips can be either chips of wood, chips of bark or nutshells, or a combination thereof. The diversity of sources of lignocellulosic materials allows embodiments of the invention to be carried out anywhere where there is a source of lignocellulosic material without incurring heavy transportation costs.

The particle sizes of the lignocellulosic material can vary. In an embodiment the adsorbent comprises lignocellulosic material having a d50 particle size of 0.05 mm to 6.0 mm, preferably 0.1 to 5.0 mm, suitably 0.2 to 3 mm.

In another embodiment, the adsorbent comprises finely divided lignocellulosic material having particles which pass sieves of Tyler Mesh 10 to 80.

The adsorbability of the adsorbent is directly proportional to the $d_{50}$ particle size of the lignocellulosic material.

The liquid is contacted with the adsorbent to remove dissolved inorganic or organic compounds from the liquid. In an embodiment the liquid is contacted with the adsorbent at a ratio between the lignocellulosic material and the liquid amounting to from 0.01:1 to 0.25:1 by mass, preferably at least 0.04:1 by mass, suitably about 0.2:1 by mass. The ratio is adjusted dependent on the amount of contaminants in the liquid.

In further embodiments the liquid can be contacted with a synthetic adsorbent material, simultaneous with the lignocellulosic adsorbent material, or before contacting the liquid with the lignocellulosic material, or after contacting the liquid with the lignocellulosic material. In an embodiment, the adsorbent material is a mixture of both lignocellulosic material and a synthetic adsorbent material. In one embodiment the adsorbent further comprises a synthetic adsorbent material, preferably selected from the group consisting of aromatic type adsorbents, modified aromatic type adsorbents, methacrylic adsorbents and mixtures thereof. The synthetic adsorbent can be selected to be specific for a particular type of contaminant removing it from the aqueous liquid. This allows for the removal of contaminants that are, e.g. particularly difficult to wash from the lignocellulosic adsorbent.

The adsorbent material is suitable to be used several times. In an embodiment adsorbent material onto which at least a portion of the contaminants from the liquid have been adsorbed is recovered and reused as an adsorbent material. The recycling and reuse of the adsorbent material is both environmentally and economically advantageous.

In a further embodiment the recovered adsorbent material is dried, washed, and dried, before reuse as an adsorbent material. In one embodiment the adsorbent material is washed with a washing agent selected from the acids and bases. Thus, the washing agent may contain for example a weak or strong inorganic or organic acid, such as a mineral acid or a carboxylic acid, or a base, for example as a weak or strong inorganic base, such as an alkali metal hydroxide or carbonate, ammonium hydroxide or an organic amine. Washing with an acid washing agent allows for the selective removal of contaminants that are soluble in acid from the adsorbent material. Washing with a basic washing agent then provides the removal of contaminants that are soluble in basic washing agents from the adsorbent, to provide a washed adsorbent material that is essentially free from adsorbed contaminants. Washing with an acid can be carried out before or after washing with a base.

As described above, the adsorbent is useful for removal of contaminants from liquids. In some embodiments the contaminants are organic compounds. In one embodiment the liquid contains organic compounds selected from the group of phenolic compounds, such as lignin, resinous and fatty acids, nitrogenous compounds, such as drug or pesticide residues or proteins, polymeric compounds and oils and combinations thereof.

The adsorbent can be arranged for contact with the liquid in various ways. In an embodiment the adsorbent is arranged in an adsorption zone, and the liquid is conducted through that zone and intimately contacted with the adsorbent in the zone. This provides a constant flow of a modified liquid.

In a further embodiment the adsorption zone comprises a filtration bed formed by the adsorbent.

In one embodiment the adsorbent is mixed with the aqueous liquid to form a slurry in which the contaminants of the aqueous liquid are contacted with the adsorbent and bonded to the adsorbent.

The method results in the provision of a modified liquid. In an embodiment a modified liquid which has a reduced content of contaminants is recovered as an effluent of the adsorption zone.

In one embodiment the aqueous phase of the slurry is separated from the dispersed material and recovered as a modified liquid with a reduced content of contaminants. In a further embodiment the portion of contaminants adsorbed onto the adsorbent material is at least 20%, in particular at least 30%, preferably at least 50%, by weight of the amount of contaminants present in the liquid.

In a still further embodiment the modified liquid is re-contacted with an adsorbent material, for example by recycling.

As described above the liquid is typically aqueous. Such an aqueous liquid can be obtained from a number of sources. In an embodiment the aqueous liquid is selected from the group consisting of hot water extraction extracts, process liquors from wood pulping mills (e.g. black liquor), waste waters, waste waters from pharmaceutical plants, waste waters from oil refineries, and agricultural run-offs. The aqueous liquid can even be drinking water from a water main. In a very specific embodiment the liquid is obtained by extracting lignocellulosic material for example by hot water extraction.

In one embodiment the liquid, in particular aqueous liquid, contains dissolved hemicelluloses. Hemicelluloses are very desirable and useful as raw materials in the production of e.g. biopolymers. In a further embodiment the aqueous liquid contains dissolved hemicelluloses and lignin compounds or fragments, and at least a part, preferably at least a majority of the lignin compounds or fragments are adsorbed to the adsorbent to provide a modified aqueous liquid. In an embodiment the modified aqueous liquid obtained by adsorption of the lignin compounds or fragments is conducted to a molecular filtration step for recovering hemicelluloses.

In one embodiment the liquid contains hemicellulose and/or other organic compounds selected from the group of phenolic compounds, such as lignin, heterogenous polysaccharides, resinous and fatty acids, nitrogenous compounds, such as proteins, polymeric compounds and oils and combinations thereof, and/or inorganic compounds, or any combination thereof.

Any method of the present invention can be used as a preliminary purification step before conventional separation technologies. Indeed, the adsorbents can be combined with other separation processes to achieve a pre-purification step. In a particularly specific embodiment, the method of the present invention is combined with conventional mechanical separation operations, such as membrane filtration. The treatment improves the efficiency of membrane filtration which is used to purify and concentrate hemicelluloses. Both the filtration capacity and purity of the final product are improved. Pure liquids containing hemicellulose enable efficient further processing of hemicelluloses e.g. by preventing membrane fouling during membrane filtrations.

As mentioned above hemicelluloses are very desirable and useful as raw materials. In an embodiment at least a portion of the recovered hemicelluloses is directed to further processing for use in industry, e.g. as a substrate in the production of specialty chemicals such as sugars and alcohols. In a further embodiment at least a portion of the recovered hemicelluloses is refined for use e.g. as packing and packaging material.

In the adsorbent on which the lignin has been adsorbed the lignin:carbohydrate ratio is higher than in virgin wood material. The adsorbent containing precipitated and/or bound lignin has an increased heating value. Thus, the wood based adsorbent material with precipitated lignin (i.e. the adsorbent contacted with a liquid containing lignin) may be utilized for producing energy, e.g. manufacturing pellets.

As mentioned above adsorption and/or precipitation of lignin compounds or fragments on an adsorbent is very desirable. In a specific embodiment the adsorbent material onto which at least a portion of the lignin from the liquid has been precipitated and/or bound is directed to further processing for use in producing pellets or briquettes. In another specific embodiment the adsorbent material onto which at least a portion of the lignin from the liquid has been precipitated and/or bound is used for energy production. As used herein "energy production" refers to e.g. production of heat by burning said adsorbent material, pellets or briquettes.

The present disclosure further includes embodiments as featured by the following clauses 1-41:

1. A method for separating dissolved contaminants from a liquid (e.g. extraction liquid), wherein the method comprises discharging a liquid through an adsorbent which comprises a cooled finely divided lignocellulosic material, which has been subjected to extraction to remove hemicellulose and/or other components therefrom, to precipitate or bind lignin and/or other components with the adsorbent optionally wherein said liquid cools when contacted with the adsorbent.

2. The method according to clause 1, wherein the method further comprises recovering a modified extraction liquid contacted with the adsorbent.

3. A method for producing a liquid containing hemicellulose and/or an adsorbent containing lignin and/or other components, wherein the method comprises contacting a liquid with an adsorbent which comprises a finely divided lignocellulosic material, which has been subjected to extraction to remove hemicellulose and/or other components therefrom, to precipitate or bind lignin and/or other components with the adsorbent and optionally recovering a modified liquid contacted with the adsorbent, wherein said liquid cools when contacted with the adsorbent.

4. The method according to any one of clauses 1-3, wherein the method further comprises cooling the adsorbent or lignocellulosic material subjected to extraction before contacting the adsorbent with the liquid.

5. The method according to any one of clauses 1, 2 and 4, wherein the adsorbent or lignocellulosic material subjected to extraction is cooled by a freezer.

6. The method according to any of the preceding clauses, wherein the adsorbent or lignocellulosic material subjected to extraction has a lower temperature than the liquid.

7. The method according to any of the preceding clauses, wherein the temperature of the adsorbent or lignocellulosic material subjected to extraction is less than 0° C. when contacted with the liquid.

8. The method according to any of the preceding clauses, wherein the temperature of the liquid to be contacted with the adsorbent is selected from the group consisting of 80-200° C.

9. The method according to any of the preceding clauses, wherein the lignocellulosic material subjected to a first extraction is cooled and used for separating a lignin component and/or other components of an extraction liquid obtained from a second extraction.

10. The method according to any of the preceding clauses, wherein the adsorbent is obtained by extracting lignocellulosic material with an aqueous solution, optionally containing an alkaline, acidic or buffering component, to remove a significant portion of the hemicelluloses and/or other compounds contained therein.

11. The method according to any of the preceding clauses, wherein the lignocellulosic material has a hemicellulose content which is at least 10 wt-%, preferably at least 20 wt-%, in particular 30 to 95 wt-%, smaller than that of the lignocellulosic material before extraction.

12. The method according to any of the preceding clauses, wherein the finely divided lignocellulosic material has a lignin content which is at least 60 wt-%, preferably 70 wt-%, suitably 80 wt-% of the lignin content of the lignocellulosic material before extraction.

13. The method according to any of the preceding clauses, wherein the adsorbent is obtained by subjecting the lignocellulosic material to hot water extraction, said hot water extraction preferably being carried out at temperature in excess of 100° C. and up to 250° C., in particular at about 110 to 200° C., preferably for a time period of 10 min to 7 days.

14. The method according to any of the preceding clauses, wherein the lignocellulosic material is recovered after extraction and used as an adsorbent for precipitating lignin and/or other components from the liquid essentially without any intermittent washing of the lignocellulosic material.

15. The method according to any of clauses 1 to 13, wherein the lignocellulosic material is recovered after extraction, washed, and used as an adsorbent for precipitating lignin and/or other components from the liquid.

16. The method according to any of the preceding clauses, wherein the lignocellulosic material recovered after extraction is dried before use as an adsorbent for precipitating lignin and/or other components from the liquid.

17. The method according to any of the preceding clauses, wherein, before use, the extracted lignocellulosic material is treated with a chemical agent selected from the group of alkaline compounds, acidic compounds and solvents and combinations thereof to modify its adsorption properties.

18. The method of any one of the previous clauses, wherein the method or the extracted lignocellulosic material is free of synthetic polymeric adsorbents.

19. The method according to any of the preceding clauses, wherein the lignocellulosic material comprises wood, such as softwood, for example spruce, pine or larch, hardwood, such as birch, poplar, aspen, alder, eucalyptus or mixed tropical hardwood, or mixtures thereof.

20. The method according to any of the preceding clauses, wherein the adsorbent comprises lignocellulosic material having a $d_{50}$ particle size of 0.05 mm to 6.0 mm, preferably 0.1 to 5.0 mm, suitably 0.2 to 3 mm.

21. The method according to any of the preceding clauses, wherein the liquid is contacted with the adsorbent at a ratio between the lignocellulosic material and the liquid amounting to from 0.01:1 to 0.25:1 by mass, preferably at least 0.04:1 by mass, suitably about 0.2:1 by mass.

22. The method according to any of the preceding clauses, wherein the adsorbent further comprises a synthetic adsorbent material, preferably selected from the group consisting of aromatic type adsorbents, modified aromatic type adsorbents, methacrylic adsorbents and mixtures thereof.

23. The method according to any of the preceding clauses, wherein adsorbent material onto or within which at least a portion of the lignin and/or other components from the liquid have been precipitated or bound is recovered and reused as an adsorbent material.

24. The method according to clause 23, wherein the recovered adsorbent material is dried, washed and dried before reuse as an adsorbent material.

25. The method according to any of the preceding clauses, wherein the portion of lignin and/or other components precipitated or bound with the adsorbent material is at least 20%, in particular at least 30% or 40%, specifically at least 50%, 60%, 70%, 80% or 90%, by weight of the amount of lignin and/or other components present in the liquid, respectively.

26. The method according to any of the preceding clauses, wherein lignin:carbohydrate ratio of the adsorbent material onto which at least a portion of the lignin from the liquid has been precipitated or bound is higher than in the adsorbent material before precipitation.

27. The method according to any of the preceding clauses, wherein the liquid contains hemicellulose and/or other organic compounds selected from the group of phenolic compounds, such as lignin, heterogenous polysaccharides, resinous and fatty acids, nitrogenous compounds, such as proteins, polymeric compounds and oils and combinations thereof, and/or inorganic compounds.

28. The method according to any of the preceding clauses, wherein the liquid is aqueous.

29. The method of any one of the previous clauses, wherein the liquid is obtained by extracting lignocellulosic material for example by hot water extraction.

30. The method according to any of the preceding clauses, wherein the adsorbent is arranged in an adsorption zone, and the liquid is conducted through that zone and intimately contacted with the adsorbent in the zone.

31. The method according to clause 30, wherein the adsorption zone comprises a filtration bed formed by the adsorbent.

32. The method according to any of the preceding clauses, wherein a modified liquid which has a reduced content of lignin and/or other components is recovered as an effluent of the adsorption zone.

33. The method according to any of clauses 3-29, wherein the adsorbent is mixed with liquid, in particular the aqueous liquid, to form a slurry in which the lignin and/or other components of the liquid are contacted with the adsorbent and precipitated or bonded to the adsorbent.

34. The method according to clause 33, wherein the liquid phase of the slurry is separated from the dispersed material and recovered as a modified liquid with a reduced content of contaminants.

35. The method according to any of clauses 2 to 34, wherein the modified liquid is re-contacted with an adsorbent material, for example by recycling.

36. The method according to any of the preceding clauses, wherein the liquid is selected from the group consisting of hot water extraction extracts, process liquors such as black liquor from wood pulping mills, waste waters, waste waters from pharmaceutical plants, waste waters from oil refineries, and agricultural run-offs.

37. The method according to any of the preceding clauses, wherein the modified liquid obtained by precipitation of the lignin and/or other components is conducted to a molecular or membrane filtration step for recovering hemicelluloses.

38. The method according to any of clauses 27-37, wherein at least a portion of the recovered hemicelluloses is directed to further processing for use in industry, e.g. as a substrate in the production of specialty chemicals such as sugars and alcohols.

39. The method according to any of clauses 27-37, wherein at least a portion of the recovered hemicelluloses is refined for use e.g. as packing and packaging material.

40. The method according to any of the preceding clauses, wherein the adsorbent material onto which at least a portion of the lignin from the liquid has been precipitated or bound is directed to further processing for use in producing pellets or briquettes.

41. The method according to any of the preceding clauses, wherein the adsorbent material onto which at least a portion of the lignin from the liquid has been precipitated or bound is used for energy production.

The following non-limiting examples illustrate the invention:

EXAMPLES

Adsorbent

Saw dust of soft wood was extracted in batch mode cooking vessel for 90 minutes at 160° C. The extraction liquor contained hemicelluloses and impurities such as lignin.

The residual saw dust was separated from extraction liquor and used to purify the extraction liquor from impurities.

Wood materials after extraction of dissolving compounds (mainly hemicelluloses and smaller molar mass carbohydrates) have proved to have excellent absorption properties.

Figure 1:
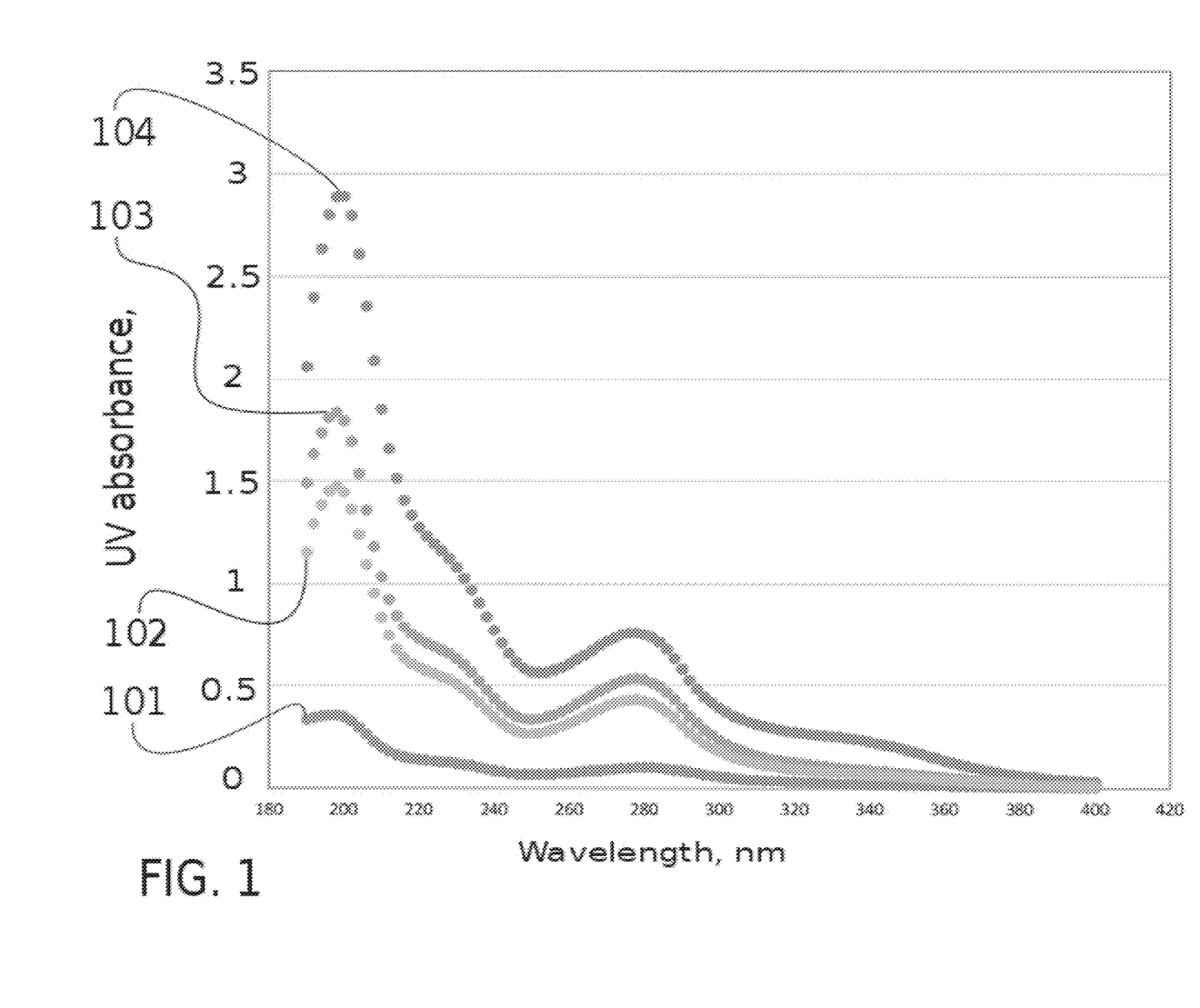
FIG. 1 is a graph showing UV absorbance values of various aqueous liquids having various contaminants.

FIG. 1 illustrates the effect of extracted sawdust on the UV absorbances of aqueous liquids having various contaminants. The UV absorbance of the extraction liquor (104), of water after treatment with extracted sawdust (101), of extraction liquor after treatment with extracted sawdust (103) is shown. The UV absorbance due to dissolution of contaminants from sawdust is subtracted from the UV absorbances of the extraction liquor after treatment with extracted sawdust (102).

The wood material after extraction purifies extraction liquor by removing lignin compounds as will appear from FIG. 1. More than 50% of lignin (UV absorbing material) was removed from the extraction liquor without significant change in the hemicellulose content when dried material was used.

Figure 2:
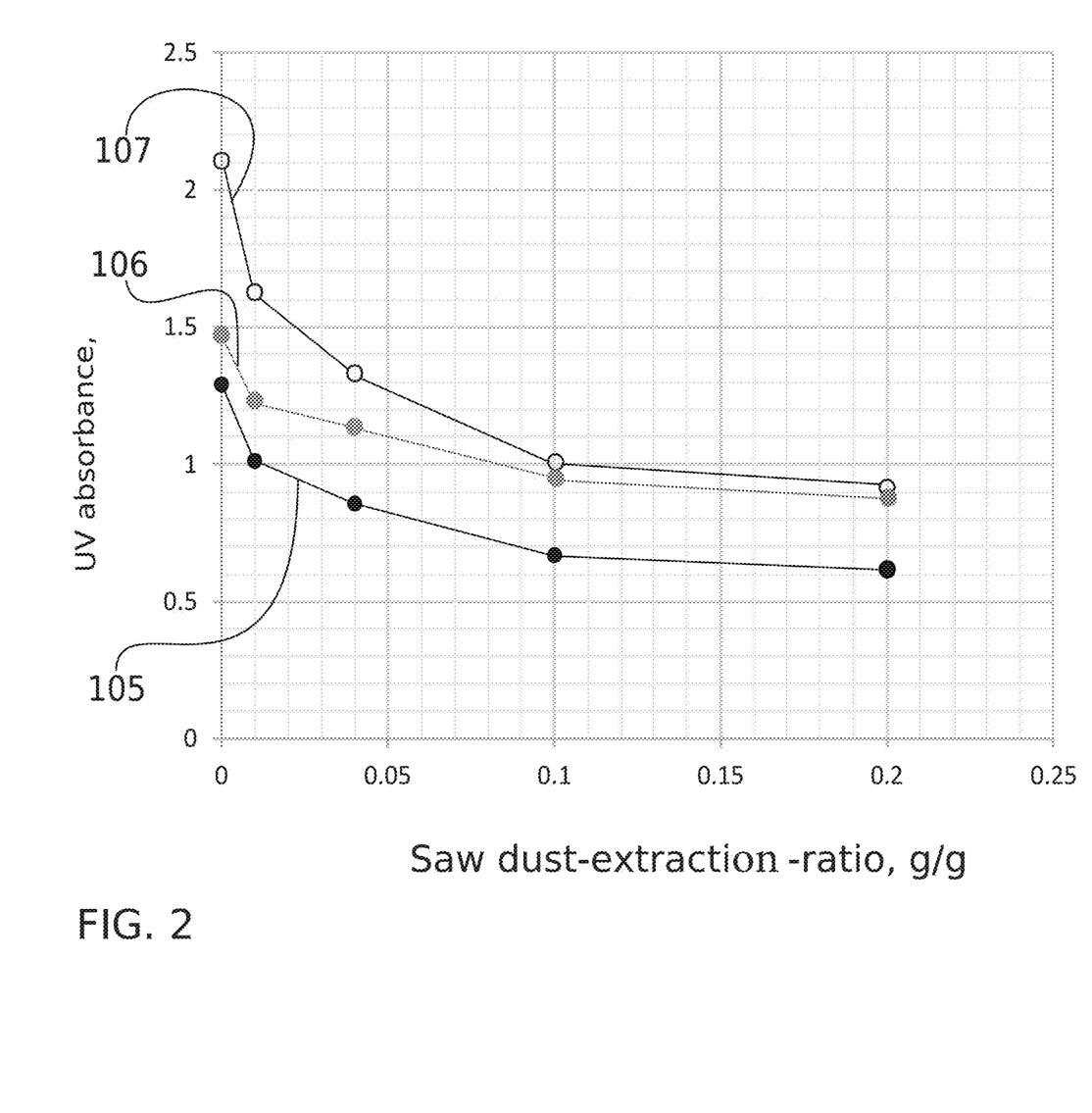
FIG. 2 is a graph illustrating the effect of ratio of extracted sawdust and extraction liquor on the removal of UV absorbing material. By increasing the saw dust amount from 0.1 to 0.2 did not significantly improve the removal efficiency. Therefore the ratio of 0.1 was used in the further experiments.

FIG. 2 illustrates the effect of ratio of extracted sawdust and extraction liquor on the removal of UV absorbing material. Data was measured at five different ratios: 0 g extracted sawdust to 1 g of extraction liquor, 0.01:1, 0.04:1, 0.1:1 and 0.2:1. The substantial differences in UV absorbance values measured at 278 (106), 208 (107) and 228 nm (105) can be observed.

As will appear, the efficiency was somewhat lower than above in FIG. 1, but clearly seen also for wet materials. Approximately 30% of UV absorbing materials was removed with wet wood material. Original saw dust had only a minor effect on the UV absorbing compounds. Adsorption experiments followed by filtration to remove saw dust from extraction liquor lead to about 15% decrease in UV absorbance.

Table 1 shows the effect of saw dust on the reduction of UV absorbance.

TABLE 1

Effect of used saw dust, and used and washed saw dust on the reduction of UV-absorbances of the extraction liquor

| Ratio 0.1 | UV 278 nm | UV 208 nm | UV 228 nm |
| --- | --- | --- | --- |
| Dried saw dust | 35.7% | 52.2% | 48.2% |
| Used and dried | 22.4% | 33.0% | 30.0% |
| Used, washed and dried, 20° C. | 38.1% | 45.3% | 43.8% |
| Used, washed and dried, 60° C. | 33.2% | 43.2% | 41.1% |

As Table 1 indicates, the sawdust can be used again to purify the extraction liquor. The removal efficiency decreased slightly but was still about 30%. If the saw dust was washed with water between the treatment steps, the removal efficiency was similar to when original dried saw dust was used.

Figure 3:
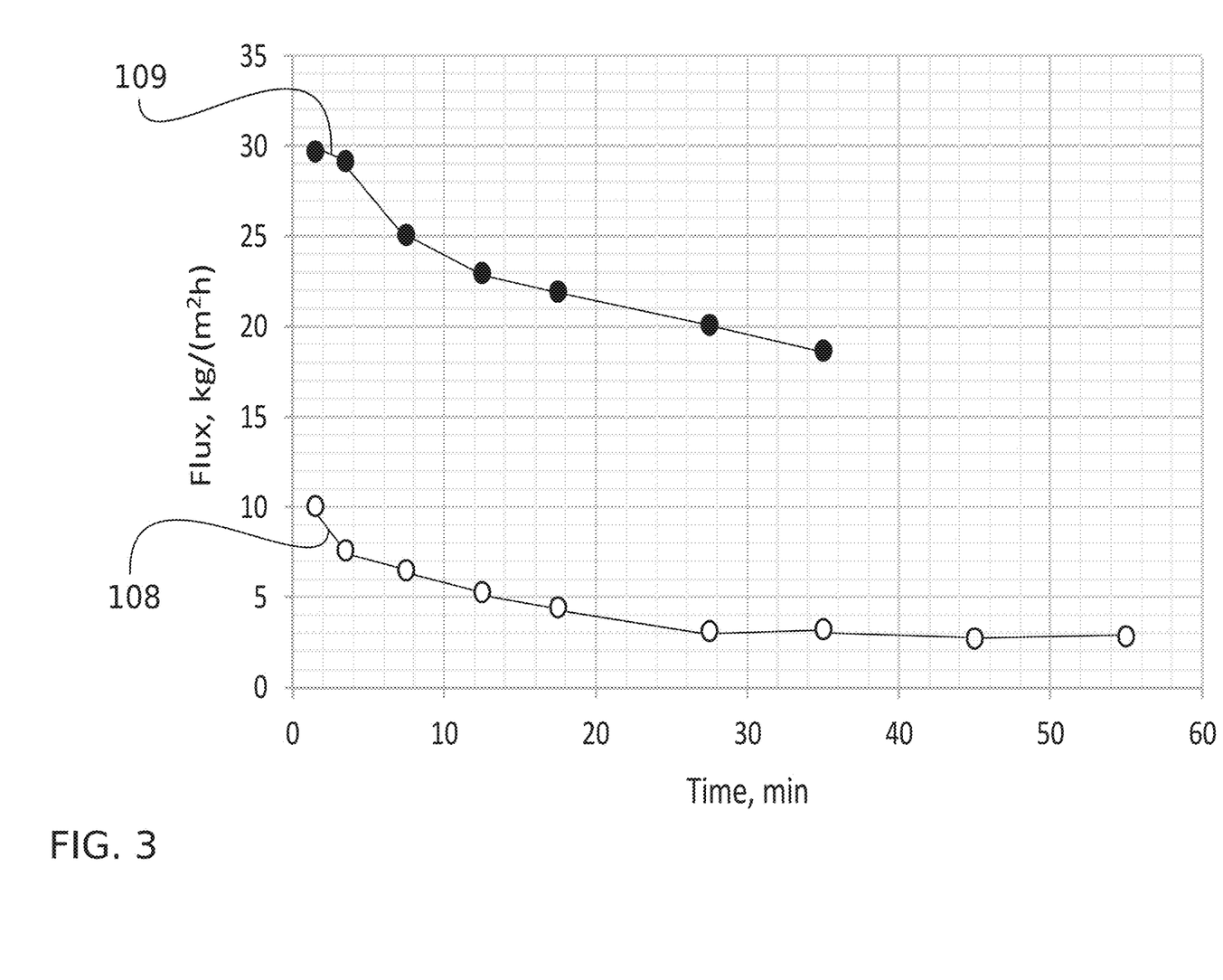
FIG. 3 is a graph illustrating filtration capacity when extraction liquor (108) and extraction liquor pretreated with extracted wood (109) is ultrafiltered to concentrate and purify hemicelluloses.

The removal of UV-absorbing compounds improves the further fractionation and concentration of hemicelluloses by membrane filtration. More than five times increase in filtration capacity was achieved, as can be seen from FIG. 3.

Based on the retention in the membrane filtration the residual saw dust removes preferably high molar mass impurities such as lignin. These compounds are concentrated with hemicelluloses and therefore the pretreatment before membrane filtration did not only increase the capacity in membrane filtration but also improves the purity of final product i.e. concentrate after membrane filtration.

Specific Method Utilizing the Adsorbent

Spruce saw dust was extracted in a batch mode cooking vessel at 160° C. for 2 hours. The extraction liquor contained hemicellulose and impurities such as lignin. The residual saw dust was separated from extraction liquor and used to purify the extraction liquor from impurities.

After extraction the extract was cooled by discharging the extract from the extraction vessel through a cooling coil or through a residual saw dust bed. The residual saw dust is a saw dust that was already used in the similar extraction (the residual saw dust and the extract are obtained either by sequential extractions of a process, or the extract and the residual saw dust are obtained from different or separate extraction methods). The residual saw dust was cooled down in a freezer before it was used as a cooling material for the extract.

Effects of the extracted saw dust on the extract were studied by UV absorbances. Table 2 shows the UV absorbance values, colour and Brix-values of the extract after it was cooled in a cooling coil or in a residual saw dust bed. About 50% reduction of UV absorbances was observed when the extract was cooled in a residual saw dust bed. Almost 60% of colour was also removed. Reduction of UV absorbances and removal of colour revel that the extract liquid contacted with the extracted saw dust contains less impurities than the extract cooled by a cooling coil. Brix-values remain the same which reveals that significant loss of the main component in the extract (i.e. hemicellulose) did not occur. The results show that the process is efficient in purification of extract without significant loss of the product (hemicellulose).

Table 2 shows the UV absorbance values, colour and Brix-values of the extract.

| Extraction conditions: 160° C., 120 min | UV absorbance | | | Colour | Brix % |
|---|---|---|---|---|---|
| | 208 nm | 228 nm | 278 nm | | |
| Extract (cooled with cooling coil) | 12.8 | 13.3 | 27.1 | 6300 | 4 |
| Extract (cooled in cold residual saw dust bed) | 6.3 | 6.9 | 15.4 | 2600 | 4 |
| Reduction | 51% | 48% | 43% | 59% | 0% |

Cooling of the extraction liquor in the cold residual saw dust bed improved the filterability of the extract significantly. Without cooling in the saw dust the permeate flux in the membrane filtration (4 kDa, UH004P membrane from Nadir-Microdyn) was zero and after treatment the permeate flux was about 20 kg/(m2h) at a pressure of 4 bar and a temperature of 65° C.).

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in the paper and pulp industries. Lignocellulosic materials after extraction of dissolving compounds (mainly hemicelluloses and smaller molar mass carbohydrates) are found to have excellent absorption properties. The wood material after extraction purifies extraction liquor by removing lignin and wood extractive compounds. This increases the purity of target compounds such as hemicelluloses. In addition, the treatment improved the efficiency of membrane filtration which was used to purify and concentrate hemicelluloses. Both the filtration capacity and purity of final product was improved. The material can also be used in a method to purify waters, e.g. to remove organic micropollutants (drug residues, pesticides) or oil from water.

The invention claimed is:

1. A method of removing dissolved contaminants comprising organic compounds from a liquid, the method consisting of the steps of:
   removing hemicellulose from finely divided lignocellulosic material by subjecting the material to hot water extraction;
   obtaining an adsorbent by recovering the finely divided lignocellulosic material after the hot water extraction;
   cooling the adsorbent to a temperature lower than temperature of the liquid;
   contacting the liquid with the cooled adsorbent; and
   allowing the cooled adsorbent to bind at least a portion of organic compounds of the liquid to the adsorbent.

2. The method according to claim 1, wherein the dissolved contaminants additionally comprise inorganic compounds.

3. The method according to claim 1, wherein the adsorbent is obtained by extracting lignocellulosic material with a hot aqueous solution, optionally containing an alkaline, acidic or buffering component, and wherein contacting the liquid with the cooled absorbent removes at least a portion of hemicelluloses contained in the liquid.

4. The method according to claim 1, wherein the lignocellulosic material recovered after the hot water extraction has a hemicellulose content which is 30 to 95 wt-% smaller than a hemicellulose content of the lignocellulosic material before the hot water extraction, and a lignin content which is at least 60 wt-% of the lignin content of the lignocellulosic material before the hot water extraction.

5. The method according to claim 1, wherein the hot water extraction is carried out at temperature in excess of 100° C. and up to 250° C., for a time period of 10 min to 7 days.

6. The method according to claim 1, wherein the lignocellulosic material recovered after extraction is used as an adsorbent for binding dissolved compounds from the liquid without any intermittent washing of the lignocellulosic material.

7. The method according to claim 1, wherein the lignocellulosic material is selected from the group consisting of softwood, hardwood, and mixtures thereof.

8. The method according to claim 1, wherein the adsorbent comprises lignocellulosic material having a $d_{50}$ particle size from 0.05 mm to 6.0 mm.

9. The method according to claim 1, wherein the liquid is contacted with the adsorbent at a ratio between the lignocellulosic material and the liquid amounting to from 0.01:1 to 0.25:1 by mass.

10. The method according to claim 1, wherein the adsorbent further comprises a synthetic adsorbent material.

11. The method according to claim 1, wherein the adsorbent onto which at least a portion of the organic compounds from the liquid have been adsorbed is recovered and reused as adsorbent material.

12. The method according to claim 11, wherein the recovered adsorbent material is dried, or washed and dried, before reuse as adsorbent material.

13. The method according to claim 1, wherein the liquid contains organic compounds selected from the group consisting of hemicellulose, phenolic compounds, heterogenous polysaccharides, resinous compounds, fatty acids, nitrogenous compounds, polymeric compounds, oils, and combinations thereof.

14. The method according to claim 1, wherein the liquid is aqueous.

15. The method according to claim 1, wherein the adsorbent is arranged in an adsorption zone, and the liquid is conducted through the adsorption zone and intimately contacted with the adsorbent in the zone, and wherein the adsorption zone optionally comprises a filtration bed formed by the adsorbent.

16. The method according to claim 15, wherein a modified aqueous liquid which has a reduced content of contaminants is recovered as an effluent of the adsorption zone.

17. The method according to claim 1, wherein the cooled adsorbent is mixed with the liquid to form a slurry in which the contaminants of the liquid are contacted with the adsorbent and bonded to the adsorbent, and wherein a liquid phase of the slurry is optionally separated and recovered as a modified liquid with a reduced content of contaminants.

18. The method according to claim 1, wherein a portion of contaminants adsorbed onto the adsorbent is at least 20 by weight of a total amount of contaminants present in the liquid, and wherein a portion of lignin bound with the adsorbent is at least 20%, by weight of a total amount of lignin present in the liquid, respectively, and wherein lignin:carbohydrate ratio of the adsorbent onto which at least a portion of the lignin from the liquid has been bound is higher than in the adsorbent material before the binding.

19. The method according to claim 13, wherein a modified liquid is obtained after adsorption onto the adsorbent and the modified liquid is re-contacted with the adsorbent in recycling.

20. The method according to claim 14, wherein the liquid is selected from the group consisting of hot water extraction extracts, process liquors from wood pulping mills, waste waters from pharmaceutical plants, waste waters from oil refineries, and waste waters from agricultural run-offs.

21. The method according to claim 1, wherein the adsorbent or lignocellulosic material subjected to extraction is cooled by a freezer.

22. The method according to claim 21, wherein said liquid cools when contacted with the adsorbent.

23. The method according to claim 1, wherein the temperature of the adsorbent is less than 0° C. when contacted with the liquid, or wherein the temperature of the liquid to be contacted with the adsorbent is in the range of 80-200° C.

24. The method according to claim 1, wherein a modified liquid obtained after adsorption and the modified liquid is conducted to a molecular filtration step for recovering hemicelluloses.

25. The method according to claim 24, wherein at least a portion of the recovered hemicelluloses is directed to further processing for use in industry, or is refined for use as packing and packaging material.

26. The method according to claim 1, wherein the method further comprises a step of producing pellets or briquettes from the adsorbent onto which at least a portion of the organic compounds from the liquid has been precipitated or bound.

27. A method for separating dissolved contaminants from a liquid, consisting of discharging the liquid through an adsorbent which comprises finely divided lignocellulosic material, which has been subjected to hot water extraction to remove hemicellulose therefrom and which has been cooled to a temperature lower than temperature of the liquid, to precipitate or bind lignin with the adsorbent, wherein said liquid cools when contacted with the adsorbent and optionally recovering a modified extraction liquid contacted with the adsorbent.

28. A method for producing a liquid containing hemicellulose and an adsorbent containing lignin, consisting of:
  removing hemicellulose from finely divided lignocellulosic material by subjecting the material to extraction by hot water extraction liquid;
  obtaining an adsorbent by recovering the finely divided lignocellulosic material after the extraction;
    contacting the extraction liquid with the adsorbent which has been cooled to a temperature lower than temperature of the liquid,
  allowing precipitation or binding of lignin with the adsorbent; and
    recovering a modified liquid contacted with the adsorbent, wherein said liquid cools when contacted with the cooled adsorbent.

* * * * *

UNITED STATES PATENT AND TRADEMARK OFFICE
CERTIFICATE OF CORRECTION

PATENT NO. : 11,278,865 B2
APPLICATION NO. : 16/492623
DATED : March 22, 2022
INVENTOR(S) : Kallioinen et al.

It is certified that error appears in the above-identified patent and that said Letters Patent is hereby corrected as shown below:

On the Title Page

Item (73) should read:
Assignee: Lappeenrannan-Lahden teknillinen yliopisto LUT, Lappeenranta (F)

Signed and Sealed this
Fifth Day of July, 2022

Katherine Kelly Vidal
*Director of the United States Patent and Trademark Office*